(12) United States Patent
Herinckx et al.

(10) Patent No.: US 10,029,652 B2
(45) Date of Patent: Jul. 24, 2018

(54) WIPER BLADE ADAPTER SYSTEM

(71) Applicant: Robert Bosch GmbH, Stuttgart (DE)

(72) Inventors: Dirk Herinckx, Dries-Linter (BE);
Helmut Depondt, Boutersem (BE);
Ingo Nijs, Zutendaal (BE)

(73) Assignee: Robert Bosch GmbH, Stuttgart (DE)

( * ) Notice: Subject to any disclaimer, the term of this patent is extended or adjusted under 35 U.S.C. 154(b) by 741 days.

(21) Appl. No.: 14/408,009

(22) PCT Filed: Jun. 6, 2013

(86) PCT No.: PCT/EP2013/061666
§ 371 (c)(1),
(2) Date: Dec. 15, 2014

(87) PCT Pub. No.: WO2013/186111
PCT Pub. Date: Dec. 19, 2013

(65) Prior Publication Data
US 2015/0135463 A1    May 21, 2015

(30) Foreign Application Priority Data

Jun. 13, 2012 (DE) .......................... 10 2012 209 867
Jun. 14, 2012 (DE) .......................... 10 2012 209 956

(51) Int. Cl.
*B60S 1/40* (2006.01)
*B60S 1/38* (2006.01)
*B60S 1/34* (2006.01)

(52) U.S. Cl.
CPC ........... *B60S 1/4003* (2013.01); *B60S 1/3436* (2013.01); *B60S 1/387* (2013.01); *B60S 1/3849* (2013.01);
(Continued)

(58) Field of Classification Search
CPC ............................. B60S 1/4003; B60S 1/387
See application file for complete search history.

(56) References Cited

U.S. PATENT DOCUMENTS

2010/0000041 A1* 1/2010 Boland ................. B60S 1/3868
15/250.32
2011/0247166 A1 10/2011 Depondt et al.
(Continued)

FOREIGN PATENT DOCUMENTS

CN            1946598 A     4/2007
CN          102161336 A     8/2011
(Continued)

OTHER PUBLICATIONS

KR20100023942A (machine translation), 2010.*
(Continued)

*Primary Examiner* — Andrew A Horton
(74) *Attorney, Agent, or Firm* — Michael Best & Friedrich LLP (57) ABSTRACT

The invention relates to a wiper blade adapter system with a wiper blade adapter unit (10) and at least two differently formed connecting elements (12, 14, 16), wherein, in a mounted state, the wiper blade adapter unit (10) is coupled to one of the at least two connecting elements (12, 14, 16). According to the invention, the wiper blade adapter unit (10) comprises a transmission unit (20) which is provided to release a coupling between the at least one connecting element (12, 14, 16) and the wiper blade adapter unit (10) during a detachment process.

22 Claims, 6 Drawing Sheets

(52) U.S. Cl.
  CPC .. *B60S 2001/4054* (2013.01); *Y10T 29/49824* (2015.01)

(56) References Cited

U.S. PATENT DOCUMENTS

2012/0079669 A1* 4/2012 Yang ................ B60S 1/387
                                              15/250.32
2013/0067674 A1* 3/2013 Chiang ............. B60S 1/4003
                                              15/250.32
2013/0104334 A1* 5/2013 Depondt ............ B60S 1/387
                                              15/250.32

FOREIGN PATENT DOCUMENTS

DE   102010041152       5/2011
FR      2848958 A1      6/2004
KR    20100023942 A  *  3/2010  ............ B60S 1/4048

OTHER PUBLICATIONS

International Search Report for Application No. PCT/EP2013/061666 dated Aug. 19, 2013 (English Translation, 2 pages).

\* cited by examiner

WIPER BLADE ADAPTER SYSTEM

BACKGROUND OF THE INVENTION

The invention relates to a wiper blade adapter system.

A wiper blade adapter system with a wiper blade adapter unit and at least two differently formed connecting elements is already known from the prior art, wherein, in a mounted state, the wiper blade adapter unit is coupled to one of the at least two connecting elements.

SUMMARY OF THE INVENTION

The invention relates to a wiper blade adapter system with a wiper blade adapter unit and at least two differently formed connecting elements, wherein, in a mounted state, the wiper blade adapter unit is coupled to one of the at least two connecting elements.

According to the invention, the wiper blade adapter unit comprises a transmission unit which is provided to release a coupling between the at least one connecting element and the wiper blade adapter unit during a detachment process, whereby a detachment can occur in a particularly simple and quick manner. A "wiper blade adapter unit" is to be particularly understood in this context as a unit which has a contact region for a connecting element and can be captively connected to the connecting element and is furthermore intended to provide a coupling region of a wiper blade component of a wiper blade, such as, in particular, a spring rail, a wiper strip, a wind deflector element and/or a wiper lip, for coupling and/or contacting to the connecting element. "Differently formed" refers particularly in this context to the fact that a form of a component deviates from a form of a further component. A "connecting element" is particularly to be understood in this context as an element which is provided to connect the wiper blade adapter unit to a wiper arm and/or a wiper arm adapter. The connecting element is particularly intended to provide a coupling region for coupling a wiper arm and/or a wiper arm adapter. The connecting element is particularly provided to be coupled to different types of wiper arm adapters. "Different types of wiper arm adapters" are particularly to be understood in this context as different wiper arm adapter systems which differ in the design and/or in the fastening function thereof. Said different wiper arm adapter systems preferably relate to standardized wiper arm adapter systems. A first type of a wiper arm adapter thereby refers in this context particularly to a wiper arm adapter which has a fastening pin and an abutment plate. A further possible type of a wiper arm adapter is thereby to be understood in this context particularly as an elongated, hook-shaped base body having a bend of 180 degrees. A further possible type of a wiper arm adapter is thereby to be understood in this context particularly as a wiper arm adapter which has two rear stops and a fastening lug. A further possible type of a wiper arm adapter is thereby to be understood in this context particularly as a wiper arm adapter which has a fastening recess and a base body having an S-shaped profile. A further possible type of a wiper arm adapter is thereby to be understood in this context particularly as a wiper arm adapter which has a fastening recess and walls comprising fastening means. "Coupled" thereby refers in this context to being connected particularly in a force- or form-fitting manner. A "transmission unit" should particularly be understood in this context as a unit which is provided, from a movement of a first component in a first direction of movement, to move at least one further component in a further direction of movement which, in particular, differs from the first direction of movement. The first direction of movement and the further direction of movement are, in particular, at least substantially perpendicular to one another. The term "at least substantially" is particularly to be understood in this context as a deviation of maximally 30 degrees, preferably of maximally 15 degrees and very preferably of maximally 5 degrees. A "detachment process" is particularly to be understood in this context as a process in which at least one connecting element is detached from the wiper blade adapter unit. "Provided" particularly refers in this case to being specially designed and/or equipped.

According to a further embodiment of the invention, the wiper blade adapter unit comprises a coupling unit which is provided to be coupled to one of the at least two connecting elements in a mounting process performed by an end user, whereby different wiper arm adapter systems can advantageously be coupled to the wiper arm adapter system with simultaneously low production costs and effort. A "coupling unit" is thereby to be understood in this context particularly as a unit which is provided for coupling a wiper blade to a wiper arm. A "mounting process" refers particularly in this case to a process which is performed by an end user or end consumer, wherein at least one final mounting step is performed during the process by means of which the wiper blade adapter system can be brought into an operating state. An "end user" should particularly be understood in this context as an end consumer and/or a private person who has at least basic technical skills. The end user deviates, in particular, from a production and/or repair shop employee and/or a person having extensive technical skills and/or a person skilled in the relevant technical field. Furthermore, the end user advantageously carries out the mounting process without any tools.

According to the invention, the coupling unit furthermore has at least one first connecting link guide which is provided to guide one of the at least two connecting elements, whereby a certain predetermined movement of the connecting element can be advantageously achieved relative to the coupling unit. A "connecting link guide" is particularly to be understood in this context as a guide track in which a connecting element is positively guided in at least one plane. A transmission function of the connecting link guide is exclusively determined by the profile of the guide track. The guide track is preferably formed from a groove. The coupling unit preferably comprises a first connecting link guide and a second connecting link guide.

A pivoting movement of the connecting element relative to the coupling unit can particularly occur in a very precise manner if at least the first connecting link guide is curved. A center of curvature of the curve preferably lies on a pivoting axis of the connecting element about the coupling unit. In addition, the connecting link guide is preferably designed in the shape of a circular arc.

According to the invention, the coupling unit further comprises at least one coupling element, which, in a mounted state, abuts against one of the at least two connecting elements in a form-fitting manner and is provided to prevent the connecting element from detaching from the wiper blade adapter unit, whereby a particularly secure coupling of the connecting element to the coupling unit can be achieved. A "coupling element" is particularly to be understood in this context as an element which is provided to be coupled to a further component in a form-fitted or force-fitted manner.

A movable mounting of the connecting element can be achieved if the coupling element has a curved bearing surface which is provided to pivotably mount at least one of the connecting elements in a mounted state. A "bearing surface" is particularly to be understood in this context as a surface which is provided for mounting a component.

The wiper blade adapter system can be utilized in very flexible manner if said wiper blade adapter system comprises at least three differently formed connecting elements which are provided for coupling to different types of wiper arm adapters. The different types of wiper arm adapters comprise, in particular, differently disposed bearing surfaces, bearing elements and/or cover elements.

Additional components, such as, in particular, cover elements and/or separate detent elements, can be advantageously avoided if at least one of the at least two connecting elements has at least one first elastically deflectable side wall which is provided for coupling to the coupling unit. One of the at least two connecting elements advantageously has a second elastically deflectable side wall.

According to the invention, at least the first side wall furthermore comprises a transverse recess in which the coupling unit at least partially engages in a mounted state, whereby the wiper blade adapter unit can be of particularly compact design. A "transverse recess" is particularly to be understood in this context as a recess which, in a main extension direction, extends parallel to a wiping direction and/or, in a wiping direction, passes through a wall which is disposed perpendicularly to the wiping direction.

A particularly secure coupling can be achieved if at least one connecting element of the at least two connecting elements has at least one first guide element which is intended to be guided in at least the first connecting link guide.

A detachment process can take place in an advantageously simple manner if at least the first guide element is designed in a hemispherical manner. "Designed in a hemispherical manner" is to be understood in this context as being designed to resemble a hemisphere.

According to the invention, the at least two differently formed connecting elements are furthermore provided in each case for coupling to different types of wiper arm adapters, whereby the wiper blade adapter system can be employed in a particularly flexible manner.

According to the invention, the coupling unit is furthermore provided to be detachably coupled to one of the at least two connecting elements, whereby the wiper blade adapter system can advantageously be employed in a modular and flexible manner. "Detachably" coupled is particularly to be understood in this context as being coupled so as to be separable in a nondestructive manner.

A particularly simple construction can be achieved if the coupling element is formed from an at least substantially cylindrical fastening element.

Weight and manufacturing costs can be saved if the fastening element comprises a longitudinal recess. A "longitudinal recess" is particularly to be understood in this context as a recess which extends in a main extension direction at least substantially parallel to a wiping direction. The longitudinal recess preferably has a round cross section and especially preferably a circular cross section. The coupling element is advantageously formed from a sleeve element.

The wiper blade adapter system can be especially easily and securely disassembled if the transmission unit has at least one ramp surface which encloses an acute angle to a base area of a connecting link guide and is provided to deflect at least the first side wall during a detachment process. The detachment process especially takes place by pivoting the connecting element relative to the wiper blade adapter unit. A "ramp surface" is particularly to be understood in this context as a surface, over which the connecting element is guided during a detachment process and can thereby be moved out of the connecting link guide. A "base area of a connecting link guide" is particularly to be understood in this context as a base area of a connecting link guide which is delimited by side walls which are provided for a lateral positive guidance of a connecting link.

According to a further embodiment of the invention, the ramp surface, in a detachment process, at least abuts against the first guide element and exerts a deflection force on at least the first side wall, whereby a deflection of the side wall can occur in a particularly reliable manner.

According to the invention, the wiper blade adapter unit comprises at least two longitudinal webs which extend at least substantially parallel to one another and are disposed on a base body of the wiper blade adapter unit, whereby a particularly large contact surface can be achieved for coupling to a wiper strip.

According to the invention, the wiper blade adapter unit has an oblique locating surface which is provided to delimit a deflection of a connecting element of the at least two connecting elements relative to a base body of the wiper blade adapter unit, whereby an excessive pivoting of a connecting element relative to the base body can be advantageously prevented.

A particularly fast disassembly of a wiper blade adapter system can result if a connecting element is detached from a wiper blade adapter unit by the connecting element being lifted on one side. The term "on one side" is particularly to be understood in this context, as viewed in the longitudinal direction, in only one edge region of the connecting element. "Being lifted" refers in this context particularly to being moved away from a wiping surface. A "longitudinal direction" is particularly to be understood in this context as a direction which extends substantially parallel to a longitudinal extension of the connecting element. A "longitudinal extension" refers in this context particularly to an extension which is as large as possible.

BRIEF DESCRIPTION OF THE DRAWINGS

Further advantages ensue from the following description of the drawings. An exemplary embodiment of the invention is depicted in the drawings. The drawings, the description and the claims contain numerous features in combination. The person skilled in the art will also expediently consider the features in isolation and put them together to form further useful combinations.

In the drawings.

DETAILED DESCRIPTION

Figure 1:
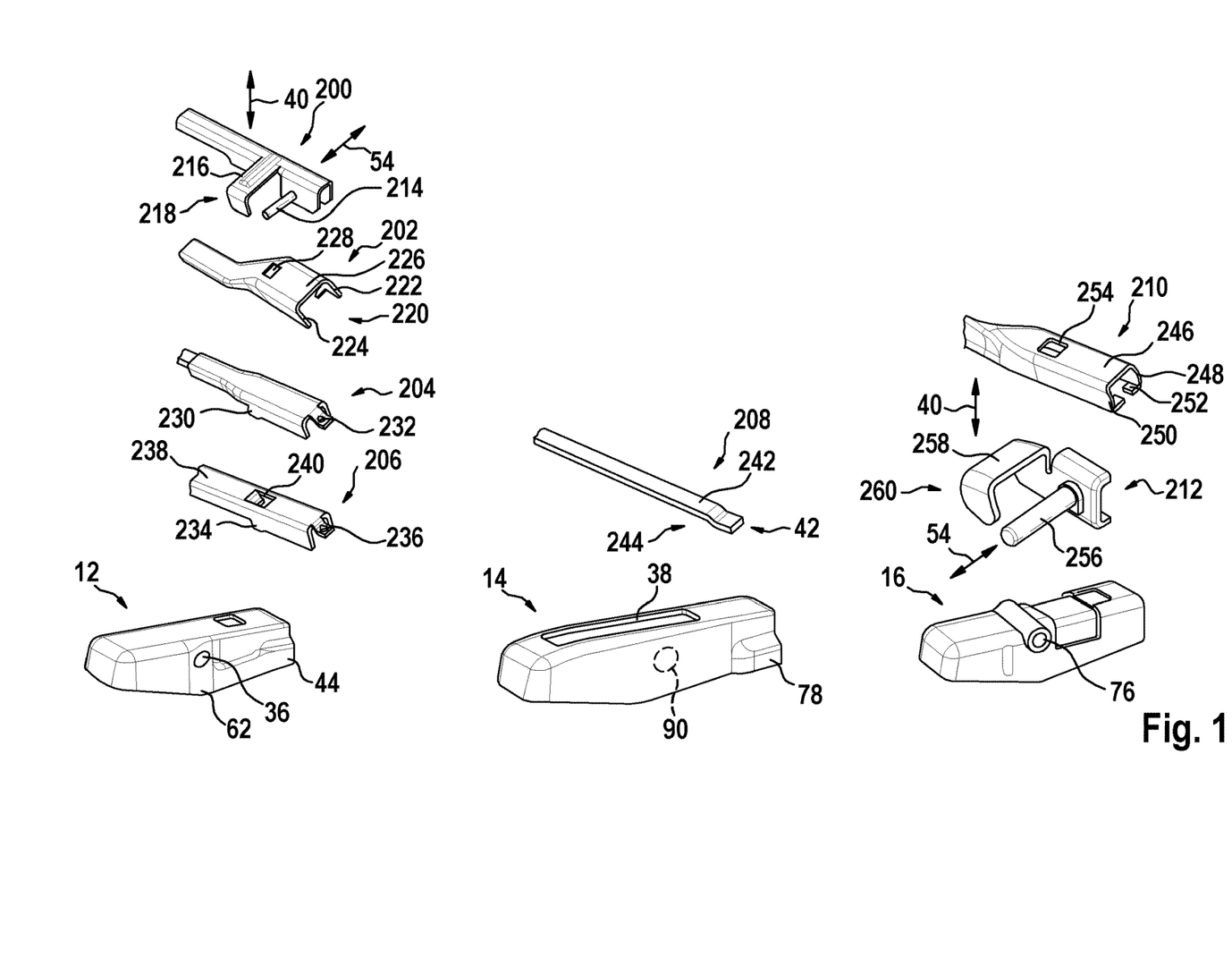
FIG. 1 shows three connecting elements of a wiper blade adapter system according to the invention and wiper arm adapters of different wiper arm adapter systems in a perspective view.
Figure 2:
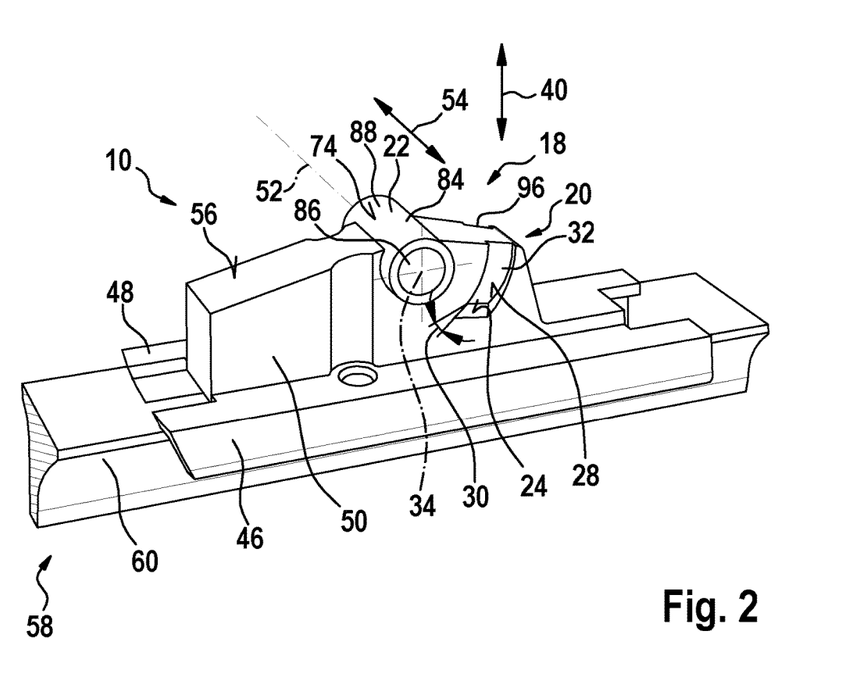
FIG. 2 shows a wiper blade adapter unit of the wiper blade adapter system from FIG. 1 in a perspective view.

FIG. 1 shows three differently formed connecting elements 12, 14, 16 of a wiper blade adapter system according to the invention. The wiper blade adapter system is provided for coupling different wiper arm adapter systems to a wiper blade 58 (FIG. 2). To this end, three differently formed connecting elements 12, 14, 16 are provided for coupling to different types of wiper arm adapters 200, 202, 204, 206, 208, 210, 212. The wiper arm adapters 200, 202, 204, 206, 208, 210, 212 of the different wiper arm adapter systems are already known from the prior art and are at least partially standardized.

The first connecting element 12 is provided for coupling to four differently shaped wiper arm adapters 200, 202, 204, 206. The first wiper arm adapter 200 thereby comprises a fastening pin 214 and an abutment plate 216. The fastening pin 214 extends parallel to a wiping direction 54 of the wiper blade adapter system. The abutment plate 216 extends initially parallel to the fastening pin 214 and bends in an end region thereof about an angle of 90 degrees in a vertical direction 40 of the wiper arm adapter system. The first connecting element 12 has a transverse recess 36 which is provided to receive the fastening pin 214 of the wiper arm adapter 200. The second wiper arm adapter 202 has a U-shaped receiving area 220 which is spanned by two side walls 222, 224 that extend parallel to one another and an abutment wall 226. The abutment wall 226 is disposed perpendicularly to the side walls 222, 224. A positioning recess 228 is disposed in the abutment wall 226, said positioning recess being provided for a defined positioning of the second wiper arm adapter 202 on the connecting element 12. The third wiper arm adapter 204 has two rear stops 230, which are formed by side walls, and a fastening lug 232. The fastening lug 232 is formed as an extension at a free end of the third wiper arm adapter 204. The fourth wiper arm adapter 206 has two rear stops 234, which are formed by side walls, and a fastening lug 236. The fastening lug 236 is formed as an extension at a free end of the fourth wiper arm adapter 206. In addition, the fourth wiper arm adapter 206 comprises an abutment wall 238 in which a positioning recess 240 is disposed, which is provided for a defined positioning of the fourth wiper arm adapter 206 on the connecting element 12. The first wiper arm adapter 200, the second wiper arm adapter 202, the third wiper arm adapter 204 and the fourth wiper arm adapter 206 can be detachably coupled to the first connecting element 12 in a known manner.

The second connecting element 14 is provided for coupling to a fifth wiper arm adapter 208 which has a further design. The fifth wiper arm adapter 208 comprises a fastening arm 242, which has an S-shaped bend in an end region 244 thereof. The fifth wiper arm adapter 208 can be detachably coupled to the second connecting element 14 in a known manner.

The third connecting element 16 is provided for coupling to the sixth wiper arm adapter 210 and the seventh wiper arm adapter 212 which each are shaped in a further design. The sixth wiper arm adapter 210 has a base wall 246 on which two side walls 248, 250 are disposed. The side walls 248, 250 each enclose with the base wall 246 an angle of 90 degrees. Fastening means 252, which in turn enclose an angle of 90 degrees to the side walls 248, 250, are disposed at a lower end of the respective side wall 248, 250. A fastening recess 254 is additionally disposed in the base wall 246 of the wiper arm adapter 210. The seventh wiper arm adapter 212 has a fastening pin 256 and an abutment plate 258. The fastening pin 256 extends parallel to a wiping direction 54 of the wiper blade adapter system. The abutment plate 258 extends initially parallel to the fastening pin 256 and bends in an end region 260 thereof about an angle of 90 degrees in the vertical direction 40. The sixth wiper arm adapter 210 and the seventh wiper arm adapter 212 are detachably coupled to the third connecting element 16 in a known manner.

The first connecting element 12 further has further a side molding 44. The side molding 44 emerges from a wall of the first connecting element 12 and forms a gripping region for a user. The second connecting element 14 has a longitudinal recess 38 which opens the connecting element 14 towards the vertical direction 40 and is provided for receiving a wiper arm adapter end region 42. The second connecting element 14 has a side molding 78. The side molding 78 emerges from a wall of the second connecting element 14 and forms a gripping region for a user. The third connecting element 16 has a transverse recess 76 which is provided for receiving the fastening pin 256 of the wiper arm adapter 212.

The wiper blade adapter system further comprises a wiper blade adapter unit 10, as is shown in FIG. 2. The wiper blade adapter unit 10 comprises a coupling unit 18 which is provided to be coupled to one of the three connecting elements 12, 14, 16 in a mounting process by an end user. To this end, the wiper blade adapter unit 10 has a contact region for one of the three connecting elements 12, 14, 16. In a mounted state, the wiper blade adapter unit 10 is coupled to one of the three connecting elements 12, 14, 16, respectively captively connected. The wiper blade adapter unit 10 has two longitudinal webs 46, 48 which extend parallel to one another and are disposed on a base body 50 of the wiper blade adapter unit 10. The longitudinal webs 46, 48 are provided for connecting to further components of the wiper blade 58, such as, in particular, a wiper strip 60, a spring rail, a wind deflector and/or a wiper lip.

Figure 7:
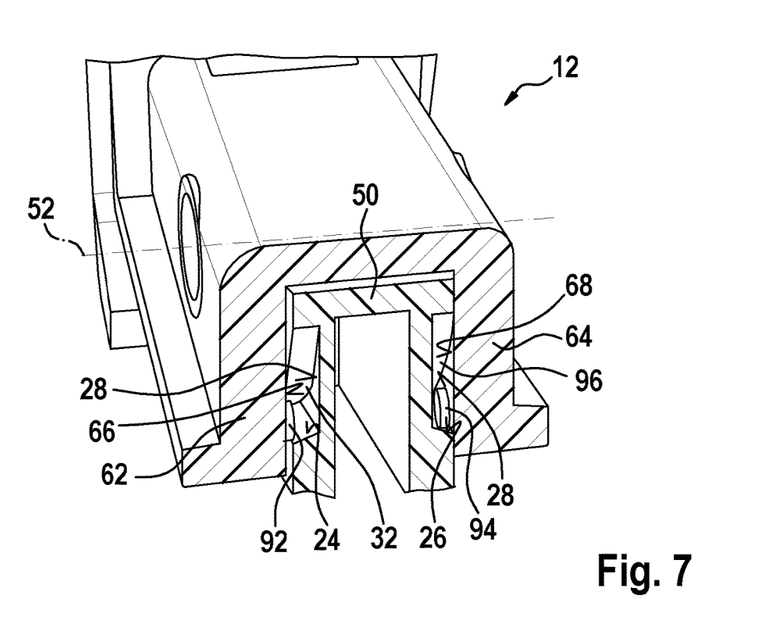
FIG. 7 shows the wiper blade adapter unit from FIG. 2 and the connecting element from FIG. 3 in a partial cross section during a detachment process.

The wiper blade adapter unit 10 comprises a transmission unit 20 which releases a coupling between the at least one connecting element 12, 14, 16 and the wiper blade adapter unit 10 in a detachment process. The coupling unit 18 has a first connecting link guide 32 which is provided for guiding one of the at least two connecting elements 12, 14, 16. The connecting link guide 32 is laterally disposed in the base body 50, i.e. in a surface thereof that is perpendicular to the wiping direction 54. A second connecting link guide 96 is disposed analogously to the first connecting link guide 32 in a rear wall of the base body 50 in a mirror-symmetric manner and is likewise provided for guiding one of the at least two connecting elements 12, 14, 16 (FIG. 7). The first connecting link guide 32 has a curvature. A curvature middle point 34 of the curvature lies on a pivoting axis 52 of the connecting element 12, 14, 16 about the coupling unit 18. The first connecting link guide 32 is furthermore arcuately shaped. The second connecting link guide 96 likewise has a curvature. A curvature middle point 34 of the curvature lies on a pivoting axis 52 of the connecting element 12, 14, 16 about the coupling unit 18. In addition, the second connecting link guide 96 is preferably arcuately shaped.

The first and second connecting link guide 32, 96 each have a connecting link guide base area 28 which is delimited by side walls. The side walls are at an angle of 90 degrees to the connecting link guide base area 28. The connecting link guide base area 28 is provided as a permanent locating surface for an element to be guided in the connecting link guide 32, 96. The side walls serve as a lateral guide or, respectively, a positive guide. The connecting link guide base area 28 extends perpendicularly to the wiping direction 54 and parallel to the vertical direction 40.

The coupling unit 18 is provided to be detachably coupled to one of the three connecting elements 12, 14, 16. In other words, a connecting element 12, 14, 16 coupled to the coupling unit 18 can be detached from said coupling unit 18 in a nondestructive manner. To this end, the coupling unit 18 comprises a coupling element 22 which, in a mounted state, abuts against on of the three connecting elements 12, 14, 16 in a form-fitting manner and prevents the connecting element 12, 14, 16 from detaching from the wiper blade adapter unit 10. It is also conceivable in this context for the coupling unit 18 to comprise further coupling elements.

The first coupling element 22 is formed from a cylindrical fastening element 84. The fastening element 84 comprises a longitudinal recess 86. The longitudinal recess 86 extends in a main extension direction of the fastening element 84. The longitudinal recess 86 furthermore has a circular cross section. Thus, the first coupling element 22 is formed from a sleeve element 88. The first coupling element 22 thereby has a curved bearing surface 74 which, in a mounted state, pivotably supports one of the connecting elements 12, 14, 16. The pivoting axis 52 of the connecting element 12, 14, 16 about the coupling unit 18 runs coaxially to the cylindrical fastening element 84 and the circular cross section of the longitudinal recess 86 of said fastening element 84.

The first coupling element 22 extends parallel to the wiping direction 54. The first coupling element 22 is disposed on the base body 50. In addition, said first coupling element 22 extends beyond the base body 50 on both sides when viewed in the wiping direction.

In FIGS. 3 to 6, a step for mounting the first connecting element 12 to the coupling unit 18 is shown by way of example. The basic mounting step is however not limited to the first connecting element 12 but can analogously be applied to the second and the third connecting element 14, 16.

Figure 3:
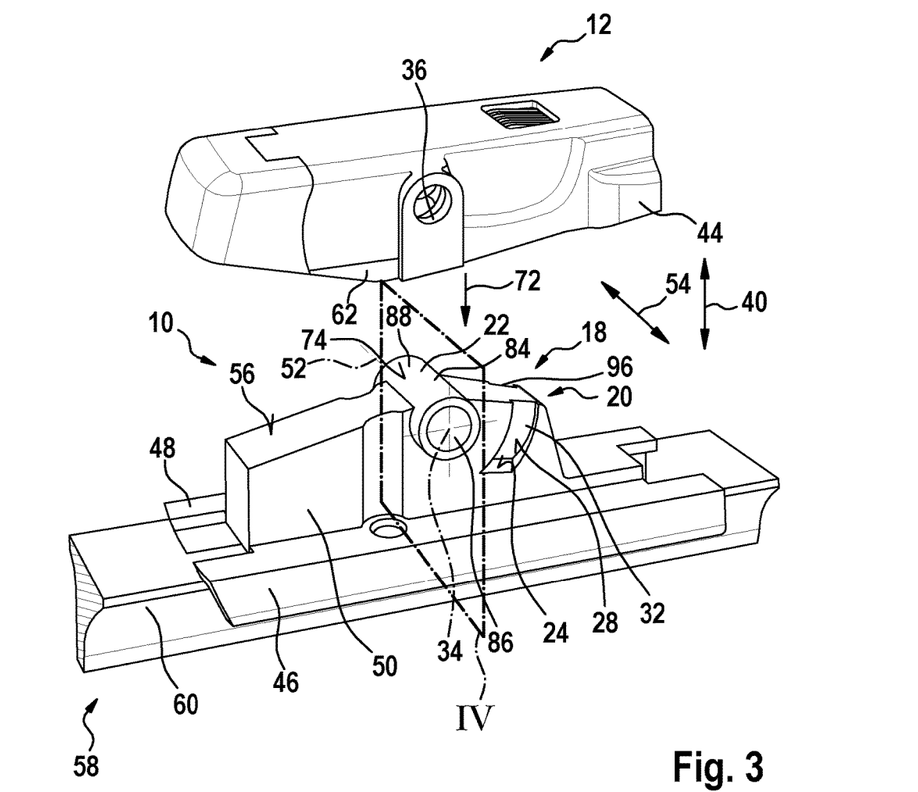
FIG. 3 shows the wiper blade adapter unit from FIG. 2 and a connecting element in a perspective view.

An initial position of the mounting step is shown in FIG. 3. The connecting element 12 is disposed above the wiper blade adapter unit 10. During the mounting procedure, the connecting element 12 is guided in a linear movement into a final coupling state with the coupling unit 18. In so doing, the linear movement takes place in a mounting direction 72 which extends at least substantially parallel to the vertical direction 40 in the direction of the wiper blade adapter unit 10. The wiper blade adapter unit 10 has an oblique locating surface 56 which delimits a deflection of the first connecting element 12 relative to the base body 50 of the wiper blade adapter unit 10 in a mounted state. The oblique locating surface 56 is disposed on a side of the base body 50 that faces away from the wiper blade 58. The oblique locating surface 56 encloses an acute angle to the two longitudinal webs 46, 48 of the wiper blade adapter unit 10.

Figure 4:
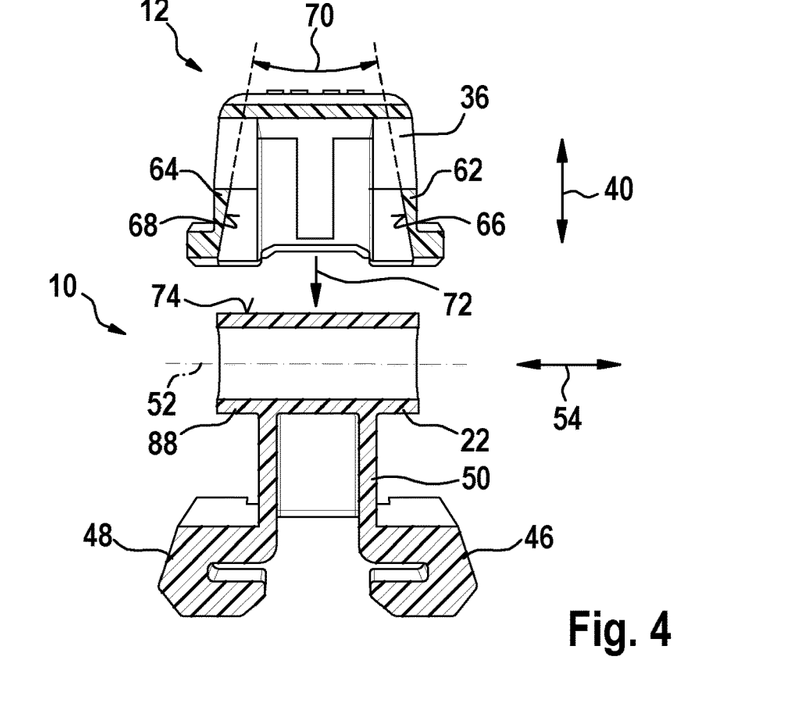
FIG. 4 shows the wiper blade adapter unit from FIG. 2 and the connecting element from FIG. 3 in a partial cross section.

FIG. 4 shows a first mounting step of the mounting process. For reasons of clarity, the wiper blade 58 is not depicted. The first connecting element 12 is moved onto the wiper blade adapter unit 10 by an end user, who is not depicted. The first connecting element 12 has a first and a second elastically deflectable side wall 62, 64 which are provided for coupling to the coupling unit 18. The side walls 62, 64 have pivoting axes that extend parallel to one another and are not depicted in detail. In addition, the side walls 62, 64 are beveled on interior surfaces 66, 68 that face one another. The interior surfaces 66, 68 thereby together enclose an acute angle 70. The interior surfaces 66, 68 extend in alignment to one another as viewed in the mounting direction 72 which extends at least substantially parallel to the vertical direction 40 towards the wiper blade adapter unit 10.

During the first mounting step, the beveled interior surfaces 66, 68 of the side walls 62, 64 come into abutment with the first coupling element 22 of the coupling unit 18. The coupling element then exerts a deflection force via the interior surfaces 66, 68 onto the side walls 62, 64. Hence, the movement of the connecting element 12 in the mounting direction 72 results in a deflection of the side walls 62, 64. When being deflected, the side walls 62, 64 are moved away from one another. The amount of deflection force required is dependent on the material used as well as on the wall thickness of the side walls 62, 64 being used and a length of the coupling element 22.

Figure 5:
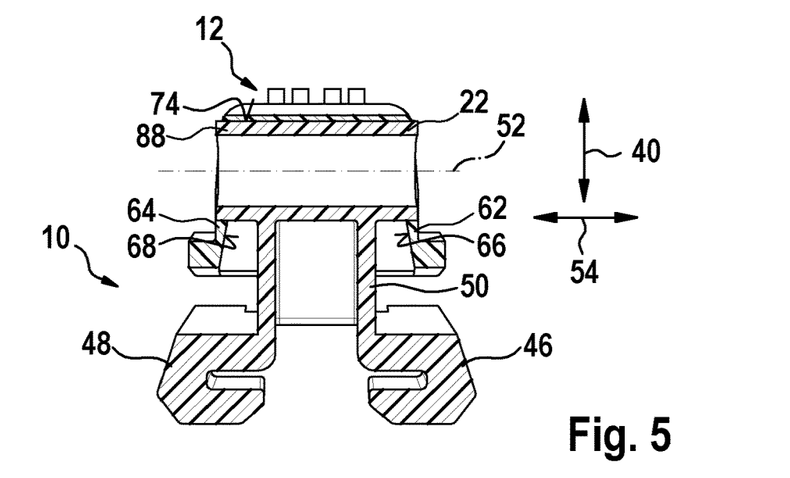
FIG. 5 shows the wiper blade adapter unit from FIG. 2 and the connecting element from FIG. 3 in a further partial cross section.

The transverse recess 36 of the first connecting element 12 is provided for coupling to the coupling element 22 in a form-fitting manner. The coupling unit 18 engages in the transverse recess 36 in a mounted state. Similarly, a transverse recess 90 of the second connecting element and the transverse recess 76 of the third connecting element 16 are likewise provided for coupling to the coupling element 22 in a form-fitting manner. After the first connecting element 12 is coupled to the wiper blade adapter unit 10, the coupling element 22 thus completely fills the transverse recess 36 (FIG. 5).

Figure 6:
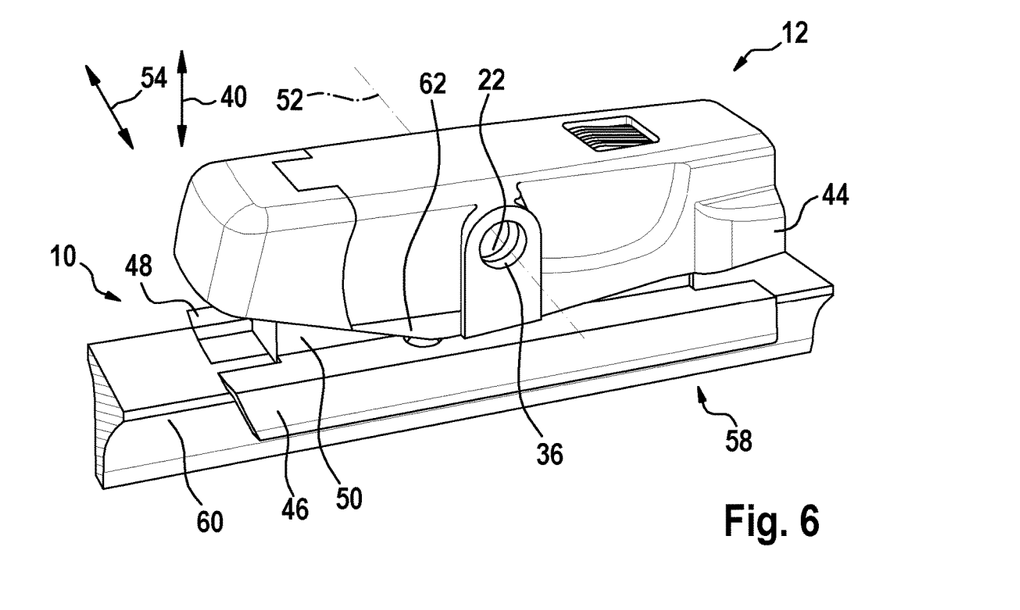
FIG. 6 shows the wiper blade adapter unit from FIG. 2 and the connecting element from FIG. 3 in a mounted state.

The wiper blade adapter system is shown in a mounted state in FIG. 6. The first connecting element 12 is pivotably mounted to the wiper blade adapter unit 10 via the transverse recess 36 and the coupling element 22.

The first connecting element 12 is shown in a perspective cross-sectional view in FIG. 7. For reasons of clarity, the wiper blade 58 is not depicted. The sectional plane thereby extends through the connecting link guides 32, 96. A first guide element 92 and a second guide element 94 are disposed on the side walls 62, 64. The first guide element 92 and the second guide element 94 face one another and are adjacent to the interior surfaces 66, 68. The first guide element 92 and the second guide element 94 are in each case designed in a hemispherical manner. Said first guide element 92 and said second guide element 94 are guided in the first connecting link guide 32 or, respectively, in the second connecting link guide 96 in an operating state or during a detachment process.

In the example shown, the first guide element 92 engages in the first connecting link guide 32. The second connecting element 94 engages in the second connecting link guide 96. When the first connecting element 12 is pivoted relative to the wiper blade adapter unit 10 about the pivoting axis 52, the guide elements 92, 94 move in the connecting link guides 32, 96.

Figure 8:
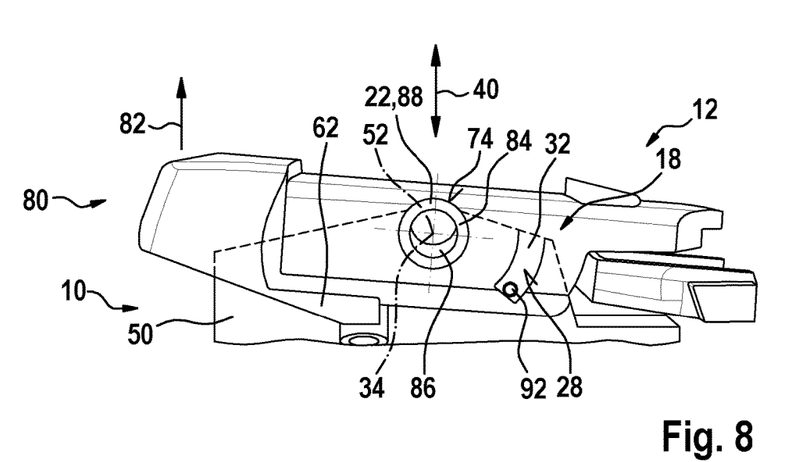
FIG. 8 shows the wiper blade adapter unit from FIG. 2 and the connecting element from FIG. 3 in a side view.

During a detachment process, the connecting element 12 is detached from the wiper blade adapter unit 10. To this end, the connecting element 12 is lifted on one side, as is shown in FIG. 8. In other words, a user exerts a lifting force 82 in a lifting region 80 during a detachment process, said lifting region being disposed at a free end of the connecting element 12. The lifting force 82 runs at least substantially parallel to the vertical direction 40. The lifting region 80 is disposed opposite the side molding 44.

The transmission unit 20 comprises a first ramp surface 24 which encloses an acute angle to the connecting link guide base area 28 and deflects the first side wall 62 and the second side wall 64 during a detachment process. A further ramp surface 26 of the transmission unit 20 is disposed in the second connecting link guide 96.

The ramp surfaces 24, 26 abut in each case against the side walls of the connecting link guides 32, 96. A component moved within the connecting link guide 32, 96 therefore initially slides across the connecting link guide base area 28 and subsequently across the ramp surface 24, which leads the component out of the connecting link guide 32, 96.

When the connecting element 12 is lifted in the lifting region 80, said connecting element is pivoted about the pivoting axis 52. The guide elements 92, 94 move in the connecting link guides 32, 96 up to the ramp surface 24. The guide elements 92, 94 are subsequently moved from the ramp surface 24 out of the connecting link guides 32, 96.

The ramp surfaces 24, 26 therefore abut against the first and second guide element 92, 94 during the detachment process and exert a deflection force on the first and second side wall 62, 64. The side walls 62, 64 of the first connecting element 12 are thereby elastically deflected.

The form-fitting coupling of the first connecting element 12 to the coupling element 22 is released by means of the elastically deflected side walls 62, 64. In other words, the first connecting element 12 is released or detached in a nondestructive manner from the coupling unit 18 via the transmission unit 20 as a result of being lifted in the lifting region 80. The connecting element 12 is therefore released from the wiper blade adapter unit 10 by said connecting element 12 being lifted on one side.

What is claimed is:

1. A wiper blade adapter system comprising a wiper blade adapter unit (10) and at least two differently formed connecting elements (12, 14, 16), wherein, in a mounted state, the wiper blade adapter unit (10) is coupled to one of the at least two connecting elements (12, 14, 16), wherein each of the connecting elements (12, 14, 16) includes an elastically deflectable side wall (62, 64), wherein the wiper blade adapter unit (10) comprises a transmission unit (20) having a ramp surface (24) which is configured to deflect the elastically deflectable side wall (62, 64) laterally outwardly to release a coupling between the at least one connecting element (12, 14, 16) and the wiper blade adapter unit (10) during a detachment process, wherein the wiper blade adapter unit (10) further comprises a coupling unit (18) which is a separate element from the transmission unit and which, in an assembly process, is configured to be coupled to one of the at least two connecting elements (12, 14, 16) by an end user, wherein the coupling unit (18) and the connecting elements (12, 14, 16) are arranged such that to install one of the connecting elements onto the wiper blade adapter unit (10), the connecting element is configured to be pressed down over the coupling unit, and the coupling unit is configured to force the elastically deflectable side wall laterally outwardly.

2. The wiper blade adapter system according to claim 1, characterized in that the coupling unit (18) has at least one first connecting link guide (32) which is configured to guide one of the at least two connecting elements (12, 14, 16).

3. The wiper blade adapter system according to claim 2, characterized in that at least the first connecting link guide (32) has a curvature.

4. The wiper blade adapter system according to claim 2, characterized in that at least one connecting element (12, 14, 16) of the at least two connecting elements (12, 14, 16) has at least one first guide element (92, 94) which is configured to be guided in at least the first connecting link guide (32, 96).

5. The wiper blade adapter system according to claim 1, characterized in that the coupling unit (18) comprises at least one first coupling element (22) which, in a mounted state, abuts in a form-fitting manner against one of the at least two connecting elements (12, 14, 16) and is configured to prevent the connecting element (12, 14, 16) from releasing from the wiper blade adapter unit (10).

6. The wiper blade adapter system according to claim 5, characterized in that at least the first coupling element (22) has a curved bearing surface (74) which is configured to pivotably support at least one of the connecting elements (12, 14, 16) in a mounted state.

7. The wiper blade adapter system according to claim 5, characterized in that at least the first coupling element (22) is formed from an at least substantially cylindrical fastening element (84).

8. The wiper blade adapter system according to claim 7, characterized in that the fastening element (84) comprises a longitudinal recess (86).

9. The wiper blade adapter system according to claim 5, characterized in that at least the first coupling element (22) is formed from a sleeve element (88).

10. The wiper blade adapter system of claim 5, wherein at least one of the elastically deflectable side walls includes a beveled interior surface configured to come into abutment with the at least one first coupling element during the assembly process.

11. The wiper blade adapter system according to claim 1, characterized by at least three differently formed connecting elements (12, 14, 16) which are configured for coupling to different types of wiper arm adapters (200, 202, 204, 206, 208, 210, 212).

12. The wiper blade adapter system according to claim 1, characterized in that at least the first elastically deflectable side wall (62, 64) comprises a transverse recess (36, 76, 90) in which the coupling unit (18) at least partially engages in a mounted state.

13. The wiper blade adapter system according to claim 1, characterized in that the at least two differently formed connecting elements (12, 14, 16) are configured in each case for coupling to different types of wiper arm adapters (200, 202, 204, 206, 208, 210, 212).

14. The wiper blade adapter system according to claim 1, characterized in that the coupling unit (18) is configured to be detachably coupled to one of the at least two connecting elements (12, 14, 16).

15. The wiper blade adapter system according to claim 1, characterized in that the ramp surface (24) abuts at least against a first guide element (92, 94) of the elastically deflectable side wall (62, 64) during the detachment process.

16. The wiper blade adapter system according to claim 1, characterized in that the wiper blade adapter unit (10) has at least two longitudinal webs (46, 48) which extend parallel to one another and are disposed on a base body (50) of the wiper blade adapter unit (10).

17. The wiper blade adapter system according claim 1, characterized in that the wiper blade adapter unit (10) has an oblique locating surface (56) which is configured to delimit a deflection of a connecting element (12, 14, 16) of the at least two connecting elements (12, 14, 16) relative to a base body (50) of the wiper blade adapter unit (10).

18. A wiper blade (58) comprising the wiper blade adapter system according to claim 1.

19. A method for detaching the wiper blade adapter system according to claim 1, wherein one of the at least two connecting elements (12, 14, 16) is released from the wiper blade adapter unit (10) by the connecting element (12, 14, 16) being lifted on one side.

20. The wiper blade adapter system according to claim 1, wherein the ramped surface is arcuately shaped.

21. The wiper blade adapter system according to claim 1, wherein the coupling unit (18) and the connecting elements (12, 14, 16) are arranged such that during installation the elastically deflectable side wall deflects laterally inwardly after extending laterally outwardly.

22. The wiper blade adapter system according to claim 1, wherein the transmission unit (20) and connecting elements (12, 14, 16) are arranged such that to remove one of the connecting elements from the wiper blade adapter unit (10), the connecting element is configured to be raised in a lifting region (80) at a first end of the connecting element, thereby forcing a second opposite end of the connecting element to pivot downwards and to engage the ramp surface (24) and deflect the elastically deflectable side wall (62, 64) laterally outwardly.

* * * * *